United States Patent
Velusamy

(10) Patent No.: US 8,509,405 B2
(45) Date of Patent: Aug. 13, 2013

(54) METHOD AND SYSTEM FOR BLOCKING COMMUNICATION SESSIONS

(75) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 13/185,168

(22) Filed: Jul. 18, 2011

(65) Prior Publication Data

US 2013/0022187 A1 Jan. 24, 2013

(51) Int. Cl.
*H04M 1/56* (2006.01)
*H04M 15/06* (2006.01)
*H04M 3/42* (2006.01)

(52) U.S. Cl.
USPC .................. 379/142.02; 379/210.02

(58) Field of Classification Search
USPC .................. 379/142.02, 142.06, 188, 207.13, 379/207.15, 210.02
See application file for complete search history.

(56) References Cited

U.S. PATENT DOCUMENTS

| 2004/0213396 A1* | 10/2004 | MacNamara et al. ... 379/210.02 |
| 2006/0195540 A1* | 8/2006 | Hamilton et al. ............. 709/206 |
| 2009/0052644 A1* | 2/2009 | Wood et al. ............. 379/142.06 |
| 2011/0085653 A1* | 4/2011 | Bailey et al. ............. 379/201.12 |

* cited by examiner

*Primary Examiner* — Quoc D Tran

(57) ABSTRACT

An approach is provided for blocking communication sessions. Attribute information of a user is acquired. A unique identifier is generated based on the acquired attribute information. The unique identifier is associated with a plurality of communication identifiers that are used to activate, respectively, a plurality of communication services, wherein the unique identifier is used to block communication sessions associated with the corresponding communication services.

18 Claims, 9 Drawing Sheets

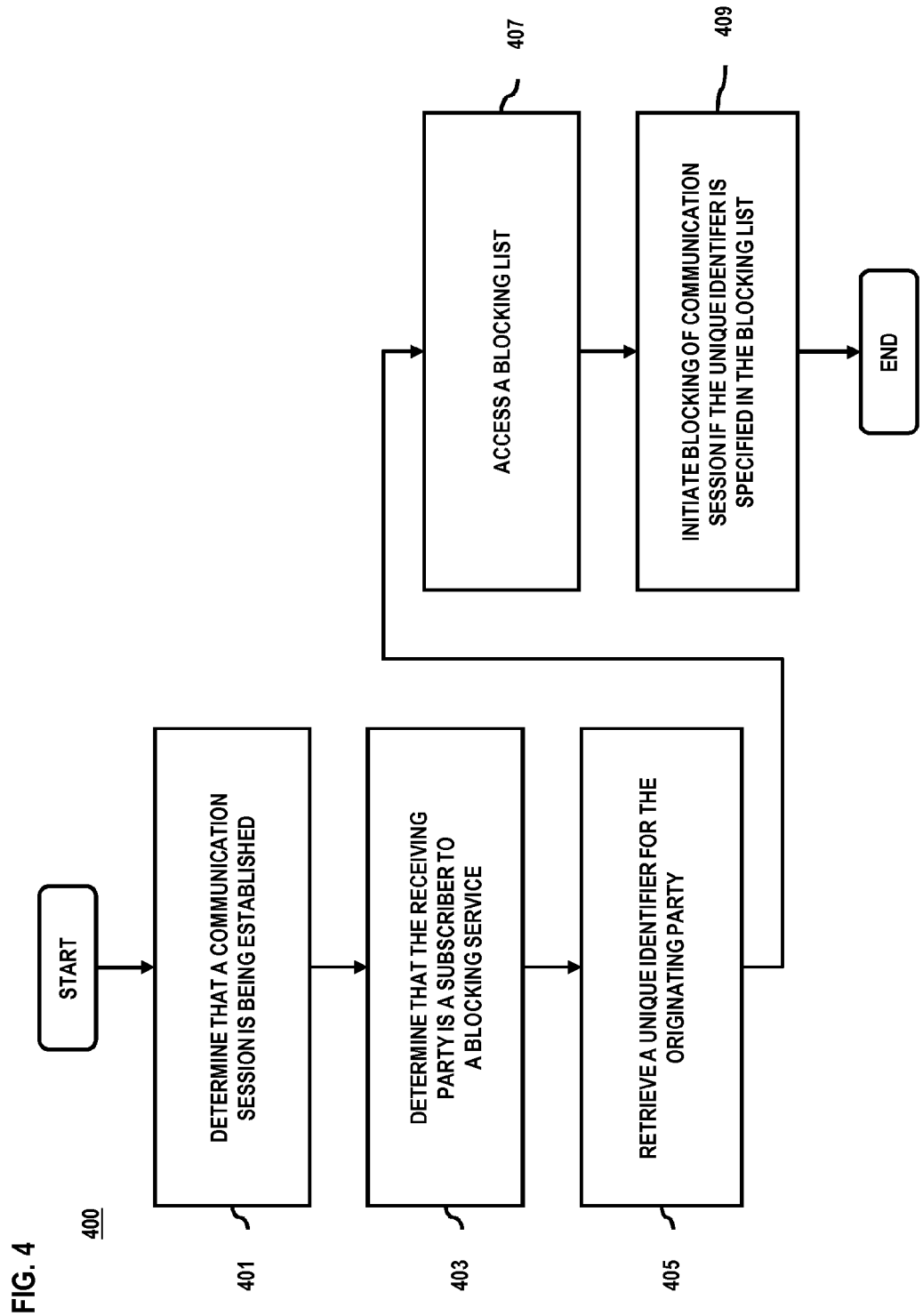

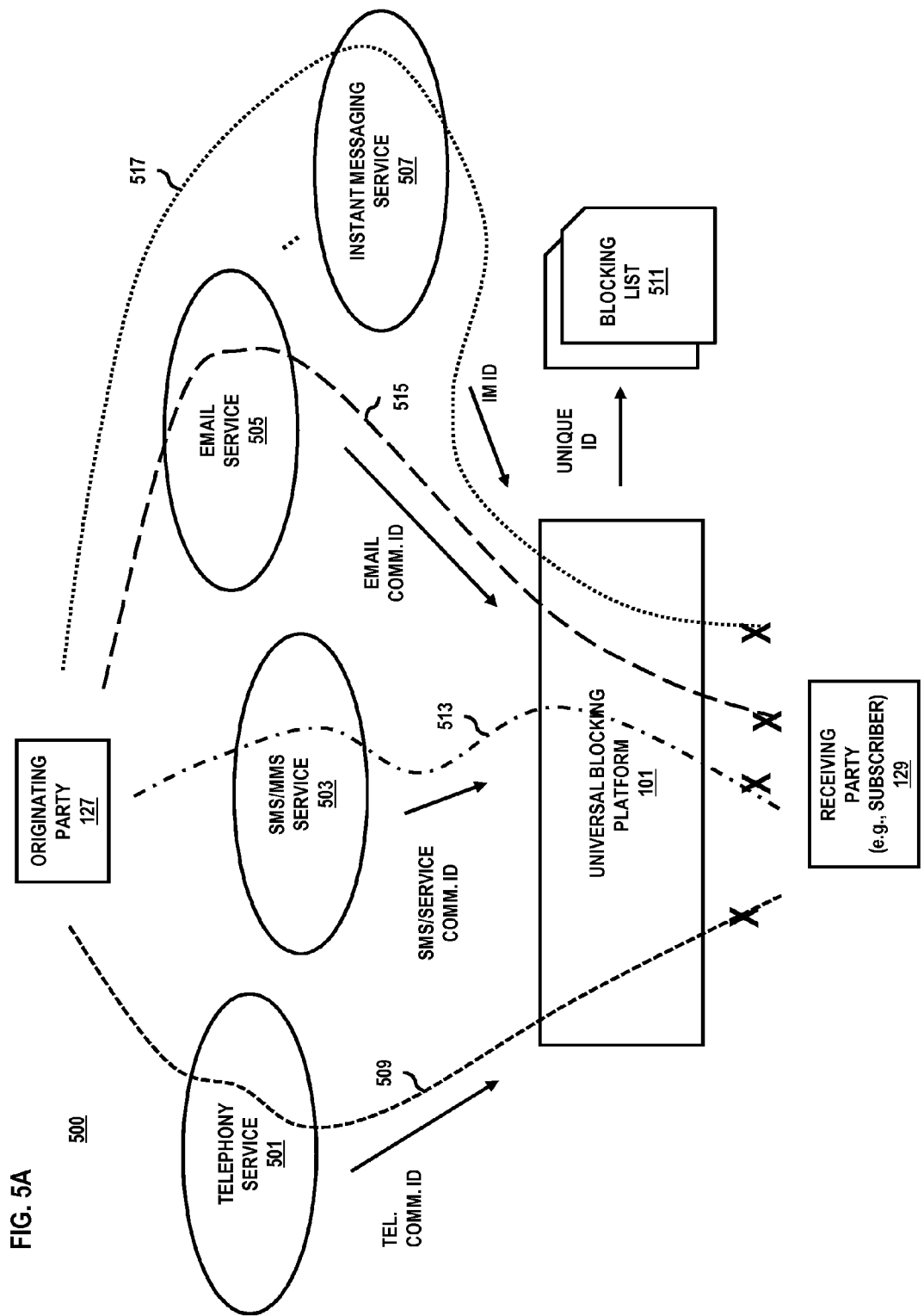

FIG. 5B

| UNIQUE ID 551 | COMMUNICATION ID 553 | SERVICE PROVIDER 555 |
|---|---|---|
| U1 | 123-456-7890<br>USER1@ACME.COM | SUPER TELCO<br>ACME |
| U2 | 222-222-2222<br>803-123-4567<br>USER2@ACME.COM | WIRELESS TELCO<br>LANDLINE CO.<br>ACME |
| ... | ... | ... |

550

900

METHOD AND SYSTEM FOR BLOCKING COMMUNICATION SESSIONS

BACKGROUND INFORMATION

The myriad of communication services, ranging from basic telephone calls to text messaging as well as emails and instant messaging, has offered tremendous flexibility and ease for users to stay in constant contact. Mobile technology has further fuel the ability to reach a broad base of consumers nearly at all times. Unfortunately, unwanted communications have plagued the effectiveness of these communication options. For example, with emails, spamming has resulted in an enormous amount of wasted network resources and needless expenditure of users' time and energy in filtering out such nuisance communications. At best, the problem is addressed at the receiving or user end with expensive spam filters; in such a scenario, network bandwidth has already been consumed before the problem is identified. In the telephony arena, the blocking of calls permits a subscriber to automatically filter out unwanted voice calls, for example, from organizations and businesses as well as individuals. Such blocking can readily be circumvented by the caller utilizing a different telephone number. Moreover, this mechanism has no analog in the other communication services.

Therefore, there is a need for an approach that effectively and efficiently enables the blocking of unwanted communications across multiple communication services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 4 is a flowchart of a process for blocking a communication session for a subscriber, according to one embodiment;

FIGS. 5A and 5B are, respectively, a diagram of an exemplary scenario involving blocking of multiple communications from a single originating party, and a diagram of a table that maps unique identifiers with communication identifiers, according to various embodiments;

DESCRIPTION OF THE PREFERRED EMBODIMENT

A preferred method and apparatus for blocking communication sessions using an unique identifier associated with a plurality of communication services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
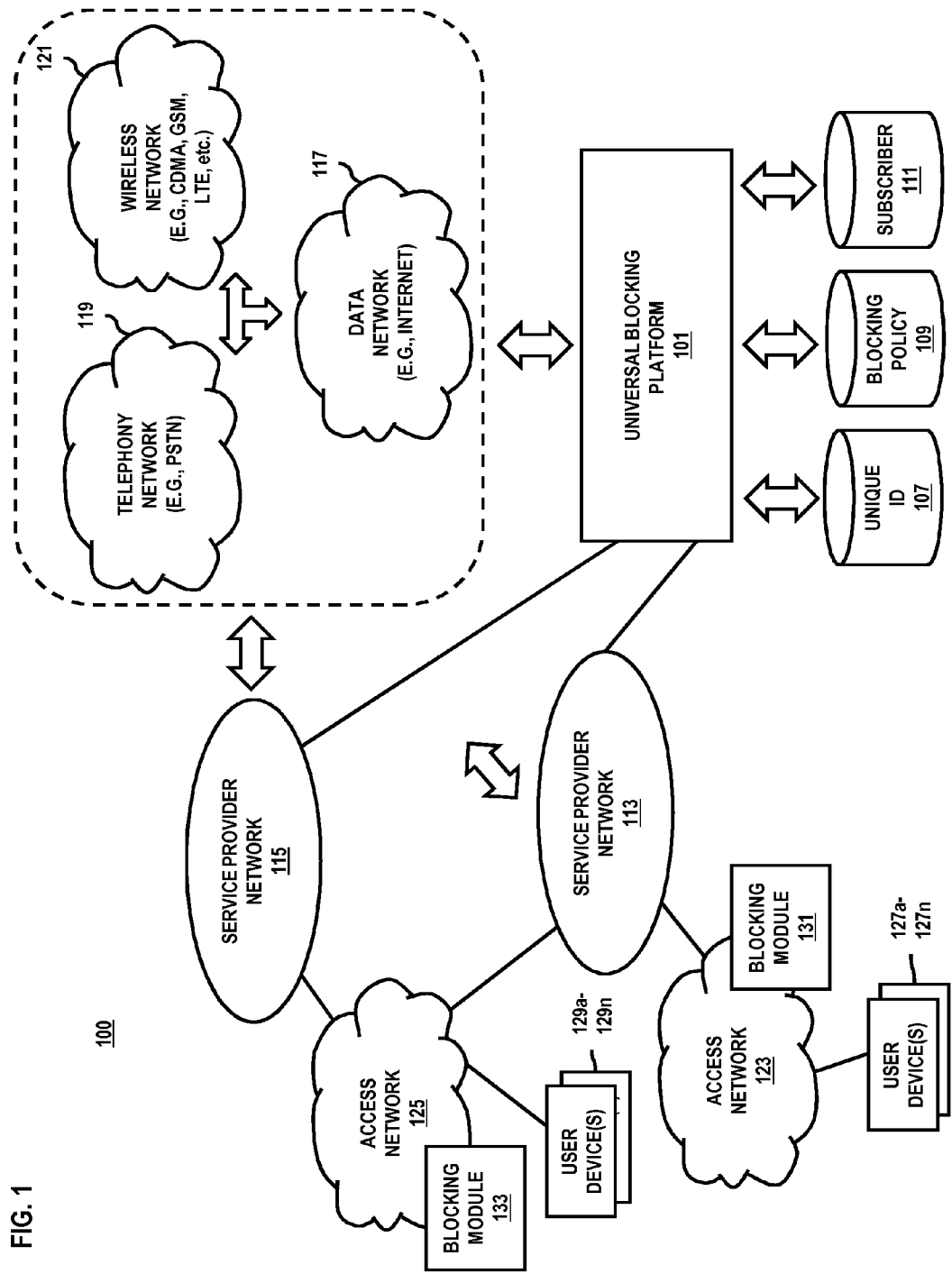
FIG. 1 is a diagram of a system capable of providing a universal blocking service, according to various embodiments.

FIG. 1 is a diagram of a system capable of providing a universal blocking service, according to various embodiments. As mentioned, the variety in communication options have, at times, resulted in wasted time and resources in filtering out unwanted communications, particularly in an environment where the source of the communications can conveniently resort to many other alternative means of communications to contact the target user or party. In recognition of this problem, system 100 employs a universal blocking platform 101 to block undesired communication sessions stemming from a originating user device (e.g., device 103) to a destination user device 105. In certain embodiments, blocking platform 101 generates unique identifiers (IDs) based on attribute information of users, and utilizes the unique IDs to block communication sessions stemming from a single originating party. The unique IDs remain unique across multiple communication services, e.g., telephony service, instant messaging (IM) service, short messaging service (SMS)/multimedia messaging service (MMS), email service, etc. Accordingly, even if the originating party switches among different communication methods, the communication session can still be successfully blocked. In essence, the block service that is provided by platform 101 is "universal" in that the unique ID can be applied irrespective of the communication means. Platform 101 can also block by access network level, common attribute level, and individual attribute level or other customizable levels.

The attribute information to be used to produce these unique IDs can be derived from personal information (e.g., home address) and/or identification assigned by governmental agencies, e.g., a social security number (SSN), a tax payer ID or business code (e.g., Employer ID Number (EIN)). For example, in the United States, the Internal Revenue Service (IRS) issues the EINs to business entities, while the Social Security Administration oversees the assignment of SSNs to individuals.

As shown, universal blocking platform 101 maintains various databases: a unique ID database 107, a blocking policy database 109, and a subscriber database 111. Unique ID database 107 stores IDs for various users who have accounts with one or more service providers. The blocking function of platform 101 can be implemented according to various policies, which are maintained in blocking policy database 109. In addition, to tracking users who seek to subscribe to the blocking service, the subscriber database 111 can be employed to store information about the particular users, along with user preferences related to the application of the blocking function.

In some embodiments, platform 101 utilize a database management system, wherein data can be stored in one or more data containers, each container contains records, and the data within each record is organized into one or more fields. For example, in relational database systems, the data containers are referred to as tables, the records are referred to as rows, and the fields are referred to as columns. In object-oriented databases, the data containers are referred to as object classes, the records are referred to as objects, and the fields are referred to as attributes.

In one embodiment, blocking platform 101 is managed by a service provider that operates service provider network 113. Platform 101, nonetheless, can interact with other service provider systems, e.g., network 115, to execute the universal blocking service. In effect, blocking platform 101 can part of either service provider network 113 or network 115.

Universal blocking platform 101 also interfaces with various communication systems. In system 100, according to certain embodiments, one or more networks, such as data network 117, telephony network 119, and/or wireless network 121, are provided to handle various communication sessions, voice communications as well as non-voice communications. Networks 117-121 may be any suitable wireline and/or wireless network. For example, telephony network 119 may include a circuit-switched network, such as the public switched telephone network (PSTN), an integrated services digital network (ISDN), a private branch exchange (PBX), or other like network. Wireless network 121 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, data network 117 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Either one of the service provider networks 113 and 115 can include portions of the various networks 117, 119, and 121. In addition, each of the service provider networks 113 and 115 can include or otherwise interface with access networks 123 and 125, respectively. Each of these access networks 123 and 125 can support multiple user devices 127a-127n and 129a-129n. The user devices 127a-127n and 129a-129n are configured to establish various communication sessions, depending on the particular communication service (e.g., telephony service, instant messaging service, short messaging service, email service, etc.). As such, user devices 127a-127n and 129a-129n may include telephone stations (e.g., plain-old-telephone service (POTS) stations, VoIP stations, etc.), mobile devices, and/or computing devices (e.g., desktop, laptop, notebook, etc.). It is noted that the mobile devices may be any type of mobile terminal including a mobile handset, mobile station, mobile unit, multimedia computer, multimedia tablet, communicator, netbook, Personal Digital Assistants (PDAs), smartphone, etc. It is also contemplated that the mobile devices may support any type of interface for supporting the presentment or exchange of data. In addition, mobile devices may facilitate various input means for receiving and generating information, including touch screen capability, keyboard and keypad data entry, voice-based input mechanisms, accelerometer (e.g., shaking the mobile device), and the like. The user devices 127a-127n, which are served by access network 123, can be associated with a common user or multiple users (or business entities).

In the use case in which the user devices 127a-127n belong to a single, common user, these devices 127a-127n can be different devices, such as a cellular phone, a laptop, a VoIP station (or soft phone), or a POTs station. Also, in another use case, the devices can be the same type of devices, e.g., VoIP stations, associated with an organization. Similarly, user devices 129a-129n can correspond to multiple users or a single user. Further, the user devices 127a-127n and 129a-129n can be associated with different users and different types of devices.

In some embodiments, universal blocking platform 101 can operate in conjunction with blocking modules 131 and 133 to provide the blocking service. Under this arrangement, the communication session can be blocked near the source; and thus, blocking platform 101 mitigates the use of network resources. That is, the communication session need not consume resources of any one or more of the networks 117-121. The blocking modules 131 and 133 can implement processes in hardware, firmware, and/or software to execute instructions from the universal blocking platform 101. For example, blocking module 131 can block emails originating from the user devices 127a-127n of a particular organization based on the unique ID of the organization received from platform 101; additionally, the blocking can be performed according to a blocking policy (e.g., no emails of a certain size or size of the attachment, etc.). Additionally, such policy can be specified to block at an access network level, a common attribute level, individual attribute level, or other customizable levels.

Blocking can be applied at different customizable levels; for example, customers of a particular service provider may elect not to receive any calls except from another customer of the provider (e.g., to save the minutes or pay higher fee per minute). Alternatively, the customers may choose to block communications from businesses based on the type of businesses—e.g., telemarketers, newspaper companies, florists, etc. In one embodiment, the blocking function can be applied through an application in the subscriber's device (e.g., user devices 127a-127n and 129a-129n).

Operations of the universal blocking platform 101 are more fully described with respect to FIGS. 2, 4, 6 and 7.

Figure 2:
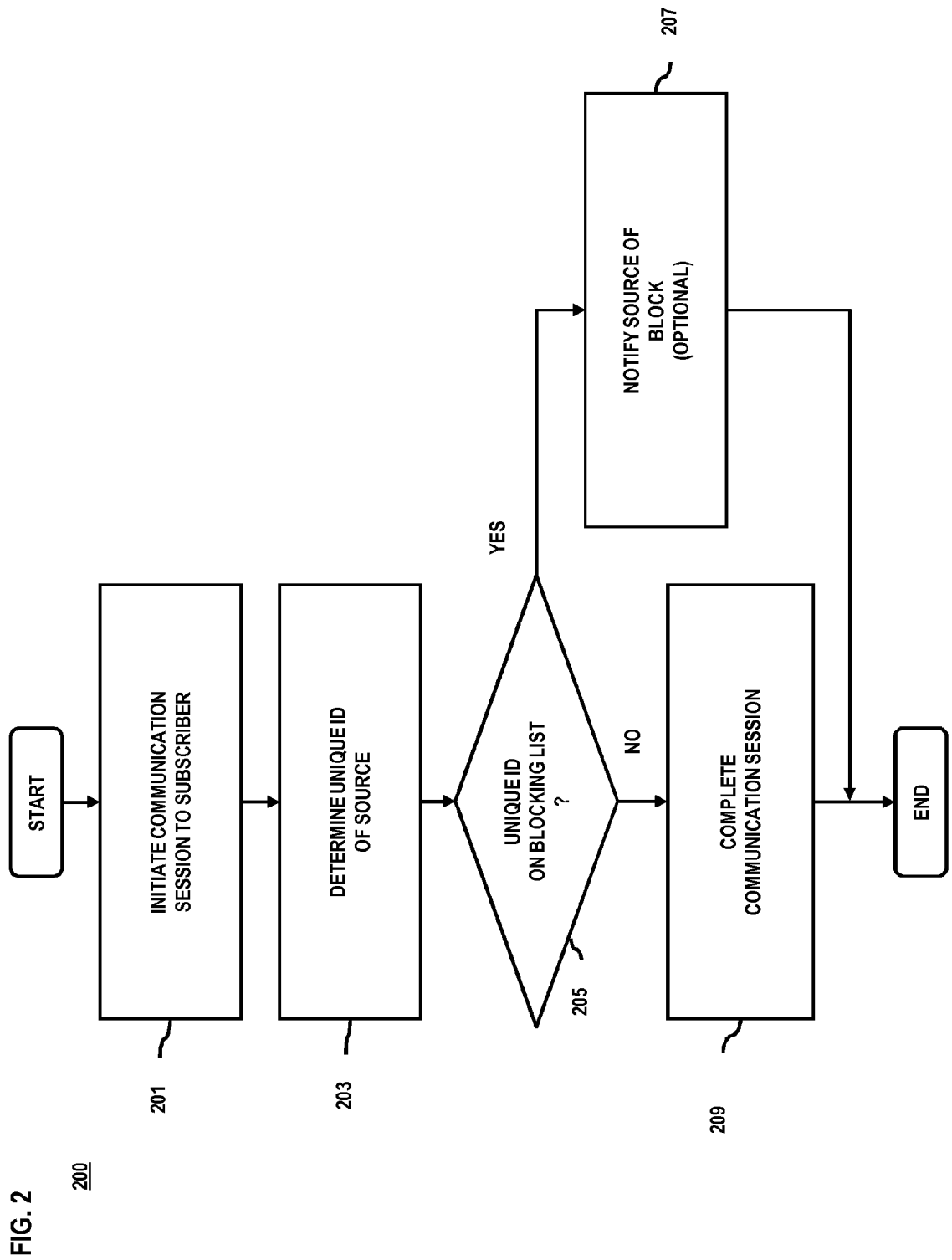
FIG. 2 is a flowchart of a process for blocking a communication session based on a unique identifier, according to one embodiment.

FIG. 2 is a flowchart of a process for blocking a communication session based on a unique identifier, according to one embodiment. Process 200, for purposes of explanation, is described with respect to system 100 of FIG. 1, whereby a user (e.g., source or originating party) employs multiple user devices 127a-127n to reach a party associated with user devices 129a-129n. For instance, the source party first attempts to reach the receiving (or destination) party by a standard landline phone (e.g., device 127a) and is blocked, and then seeks another means, e.g., by texting via a cellular phone (e.g., device 127b). It is noted that the steps of the process 200 may be performed in any suitable order, as well as combined or separated in any suitable manner.

In step 201, a communication session is initiated by a originating party via a user device 127b (e.g., cellular phone) to a subscriber party associated with user device 129a (e.g., cellular phone), according to a particular communication service, e.g., text messaging. The communication session is established using an identifier specific to the particular communication service, which in this example, is a telephone number for the SMS message. In step 203, a unique ID is determined based on the communication identifier—i.e., telephone number. Communication identifiers are used to activate respective communication services; e.g., email address to establish an email session, a telephone number to initiate a voice call, an instant messaging (IM) identifier to conduct an IM session, etc. By way of example, the telephone number is mapped to a unique ID for the originating party; the unique ID can be derived from another identifier that is unrelated to communications, such as a SSN. Alternatively, the unique ID can actually be the SSN (assuming proper safe guards are in placed to protect the privacy of the users). Based on this unique ID, process 200 then determines whether the ID is on a blocking list for the subscriber party to whom the communication session is destined, as in step 205. If the unique ID is an entry on the blocking list, then the communication session is blocked, per step 207. Thus, the text message does not reach the target party's user device 129a. If no such entry exists for the blocking list of the subscriber, then the text message is delivered (step 209).

Process 200 can be repeated for each of the various communication methods. By contrast, traditional blocking service pertains to only telephony service, and thus, the source party can still reach the destination party through another method, e.g., by texting or emailing.

Figure 3:
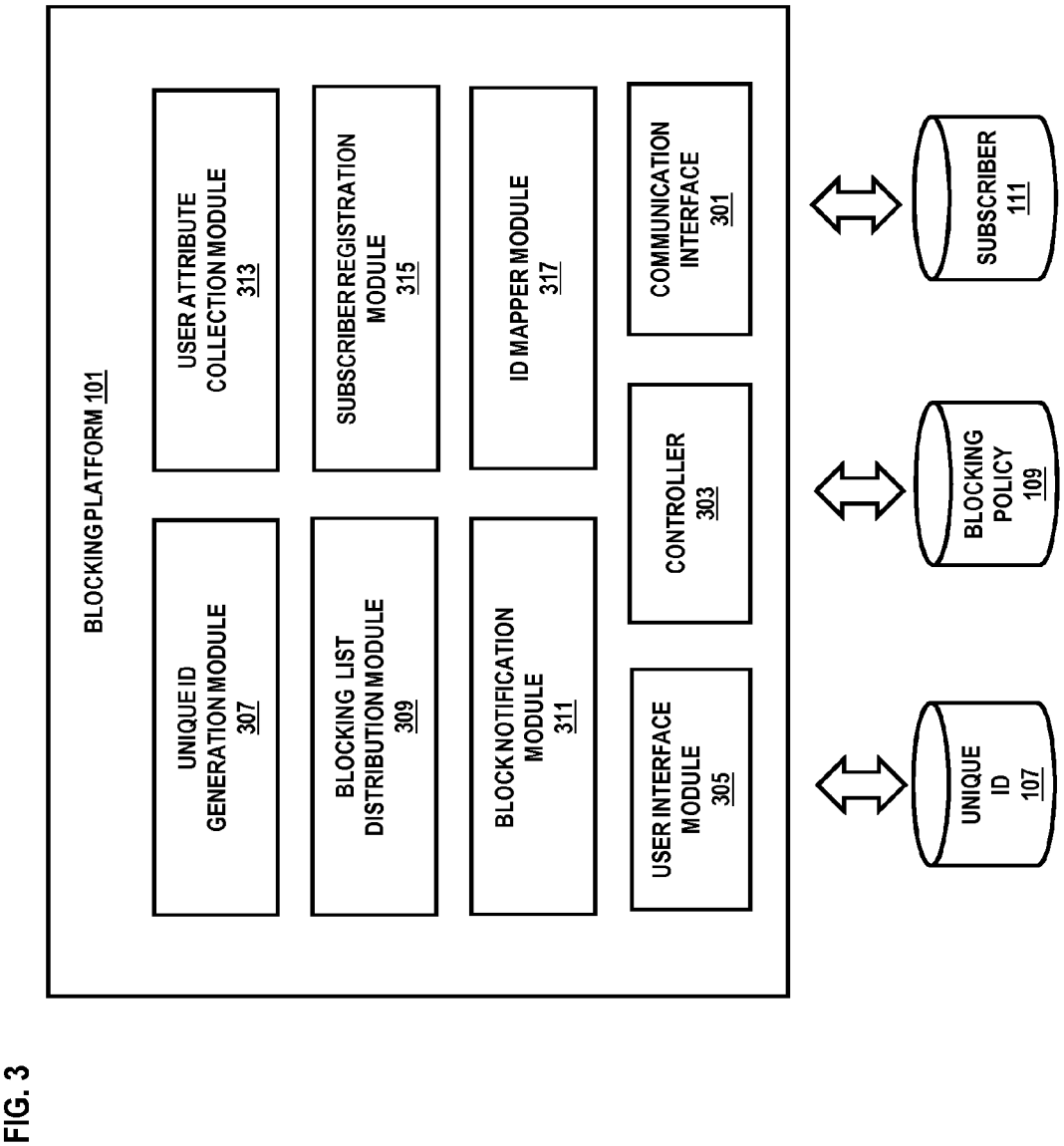
FIG. 3 is a diagram of a blocking platform utilized in the system of FIG. 1, according to one embodiment.

FIG. 3 is a diagram of a blocking platform utilized in the system of FIG. 1, according to one embodiment. As seen, blocking platform 101 may comprise computing hardware (such as described with respect to FIG. 8 and FIG. 9), as well as include one or more components configured to execute the processes described herein for providing the universal blocking services. In certain embodiments, blocking platform 101 includes communication interface 301, controller (or processor) 303, user interface module 305, unique ID generation module 307, a blocking list distribution module 309, and a block notification module 311. Additionally, platform 101 provides a user attribute collection module 313, a subscriber registration module 315, and an identifier (ID) mapper module 317. Further, platform 101 may also communicate and maintain with one or more repositories: unique ID database 107, blocking policy database 109, and subscriber database 111. While specific reference will be made to this particular implementation, it is also contemplated that platform 101 may embody many forms and include multiple and/or alternative components. For example, it is contemplated that the components of platform 101 may be combined, located in separate structures, or separate locations.

Unique ID generation module 307 operates in conjunction with user attribute collection module 313 to produce unique IDs that are span across multiple communication services and are globally unique for these services. The services may include telephony service, instant messaging service, short messaging service, email service, etc. As mentioned, in certain embodiments, blocking platform 101 generates unique IDs using attribute information of users. The attribute information are obtained by user attribute collection module 313, which can interface various external systems (e.g., governmental systems). In one embodiment, the attribute information can include personal information, such as addresses. Additionally, as noted, the attribute information can be assigned by governmental agencies, e.g., a social security number (SSN), a tax payer ID or Employer ID Number (EIN). It is contemplated that other identifiers can be utilized, so long as the IDs can be mapped directly to individuals or organizations. Blocking platform 101 further permits look up via the user interface module 305 of blocking status using the unique identifiers.

Blocking list distribution module 309 can inform other systems and blocking modules 131 and 133 of the blocking lists. Also, updates of blocking lists can be readily implemented by module 309.

In one embodiment, blocking platform 101 provides notifications to source or originating parties that their communication sessions are being blocked. These notifications are generated by block notification module 311. The module 311 can coordinate the generating of messages or singles according to the particular communication service. For example, if the communication session involves SMS, then module 311 can ensure that an SMS message is produced to respond to the source party's message as follows: "TEXT MESSAGE BLOCKED."

According to certain embodiments, the universal blocking service is offered as a subscription service, whereby users seeking use the service pay a subscription. The subscription can be charged on a recurring basis or on a per transaction basis. Subscriber registration module 315 manages the subscription process, in which users can, via user interface module 305, register for the service. During the subscription process, various user information can be obtained to setup a user account for the service. Also, user attribute information can be gathered at this time. Further, user preference information relating to the universal blocking service can be specified by the subject user during the registration process. As such user profile can be established by module 315 and stored in subscriber database 111.

User interface module 305 may be configured via a web browser, web portal or other network-based application or system, such as a voice browser or interactive voice recognition system. By way of example, the user interface module 305 permits users, in conjunction with subscriber registration module 315, to directly register for the blocking service.

Although not shown, blocking platform 101 may also include an authentication module to authenticate users for interaction with the platform 101; e.g., as in the subscription process. By way of example, the authentication module receives a request from a user (who is a subscriber to the universal blocking service) to modify user profile information or preferences pertaining to the blocking list and/or policy.

ID mapper module 317 serves to identify communication identifiers used to establish communication sessions with the unique ID. In one embodiment, this is a many-to-one mapping between the unique ID and the communication identifiers (e.g., telephone number, email address, IM identifier, etc.). As explained, different communication services may utilize different communication identifiers; by mapping these potentially different communication identifiers to a single globally unique identifier, blocking can be performed for a portion or all of these services.

In one embodiment, a communication interface 301 enables the formation of a session between the blocking platform 101 and one or more user devices (e.g., devices 127a-127n and 129a-129n). By way of example, the communication interface 301 executes various protocols and data sharing techniques for enabling collaborative execution between a subscriber's user device 127a-127n and 129a-129n (e.g., mobile devices, laptops, smartphones, tablet computers, desktop computers, set-top boxes, etc.) and the blocking platform 101 over the corresponding service provider network 113 or 115.

FIG. 4 is a flowchart of a process for blocking a communication session for a subscriber, according to one embodiment. Process 400 can be executed by collectively or individually by universal blocking platform 101 and blocking modules 131 and 131.

In step 401, process 400 determines that a communication session is being established from an originating party using user device 127a to a receiving party by way of user device 129a. Process 400 then, per step 403, determines that the receiving party is a subscriber to a blocking service. This determination can be based on the communication identifier associated with user device 129a. The process for subscribing the user to the universal blocking service is described in FIG. 6. Next; a unique identifier is retrieved for the originating party, as in step 405. According to one embodiment, platform 101 obtains user account information and communication identifiers for all users/subscribers of the various services offered by service provider networks 113 and 115. The user account information can supply the attribute information for generating the unique IDs. As described, in certain embodiments, the attribute information uniquely identify a particular individual, and can include identification information provided by a governmental agency. Such government IDs include, e.g., a social security number (SSN), a tax payer ID or Employer ID Number (EIN). These unique identifiers can be associated with multiple communication services; one of the communication services is utilized for the communication session initiated by the originating party.

In step 407, a blocking list is accessed for the subscriber to determine whether the unique identifier of the originating party is specified in the blocking list. Blocking of the communication session is initiated if the unique identifier is specified in the blocking list (step 409). In one embodiment, the unique identifier (in addition to the particular communication identifier) is transported as part of establishment of the communication session.

It is noted that the steps of the process 400 may be performed in any suitable order, as well as combined or separated in any suitable manner.

FIGS. 5A and 5B are, respectively, a diagram of an exemplary scenario involving blocking of multiple communications from a single originating party, and a diagram of a table that maps unique identifiers with communication identifiers, according to various embodiments. As with the scenario of FIG. 2, an originating party can employ a variety of user devices 127a-127n to contact a receiving party at various user devices 129a-129n registered with the receiving party. For illustrative purpose, originating party is labeled 127 to denote that one of the user devices 127a-127n is utilized; likewise, receiving party is labeled 129 to indicate that one of the user devices 129a-129n is employed by the receiving party. As shown, a number of different communications are attempted by the originating party 127 to reach the receiving party 129: a telephony service 501, SMS/MMS service 503, email service 505, and instant messaging (IM) service 507.

Under this example, the originating party 127 first tries to call to the receiving party 129, who is a subscriber to the universal blocking service of platform 101. The voice call establishment 509 specifies the destination directory number of the receiving party 129. Using the destination directory number, blocking platform 101 accesses blocking list 511 (as explained above with respect to process 400 of FIG. 4) to check whether the originating party 127 should be blocked. This determination is based on the unique ID of the originating party 127, even though the particular directory number of the originating 127 may be the only information for the originating party 127 that is supplied. Alternatively, the communication session attempt 509 may specify the unique ID of the originating party 127. Because the unique ID of the originating party 127 appears in the blocking list, universal blocking platform 101 blocks the communication attempt 509.

In one scenario, when the subscriber (receiving party 129) receives the call, based on the caller's unique identifier or based on a look up of the unique identifier belonging to the caller ID (or automatic number identifier (ANI)), and the subscriber's preference on accepting the call (i.e., as indicated by the blocking list 511), the call may or may not be allowed to proceed. The caller can change the caller ID (or phone number) any number of times; but as long as the unique identifier of the caller does not change, the caller would not be able to reach the subscriber under the approach of platform 101.

After learning of the blockage for the telephony service 501, the originating party 127 then attempts to contact the receiving party 129 using the SMS/MMS service 503. In the case, the originating party 129 generates an SMS message, and initiates sending of the SMS message to the receiving party 129 via communication session 513. However, because the originating party 127 is being prevented from communicating with the subscriber party 129 based on the unique ID, the originating party 127 cannot simply "switch" to another form of communications. Accordingly, the communication session 513 does not reach the receiving party 129.

Undeterred, the originating party 127 now tries to send an email message using email service 505 over a communication session 515. Again, the universal blocking platform 101 blocks the message from being delivered to the receiving party 129 based on the unique ID.

Lastly, originating party 127 attempts to send an instant message via instant messaging service 507 over path 517. Because unique ID of the originating party 127 is on the blocking list 511, the email is blocked. In effect, blocking can performed at the access network level.

As shown in FIG. 5B, a table 550 provides a mapping of unique identifiers with communication identifiers for users of communications services of the service providers. This table 550 can be stored in unique ID database 107 (FIG. 1). By way of example, a Unique ID field 551 is included in table 500. In this example, two users have been assigned unique IDs, U1 and U2. Additionally, table 550 includes a Communication ID field 553 and Service Provider field 555. It is contemplated that equivalent fields can be utilized, as well as other fields, depending on the application. For user U1, this user has been identified with three different communication services: landline telephony service, email service, and cellular service (e.g., SMS/MMS service in addition to cellular voice). The communication identifier for the landline telephony service is "123-456-7890," while the email service specifies an email address of "user1@acme.com." The cellular service is associated with a communication identifier of "222-222-2222." Another user with unique ID of "U2" has two communication services: landline telephony service, and email service. The communication identifiers for the landline telephony service, and email service are "803-123-4567" and user2@acme.com.

In some embodiments, the users, who are tracked by unique ID database 107, can employ services from any number of service providers. For instance, for landline telephony service, different providers can be maintained: "Super Telco" for user U1 and "Landline Co." for U2. Such information can be retrieved from the service provider networks 113 and 115, for example.

Universal blocking platform 101 interacts with services 501-507 by utilizing the appropriate protocols and control signaling to effect the blocking of the communication sessions 509, 513, 515, and 517. In the case of telephony service 501, platform 101 can instruct the telephony service 501 to implement a traditional call blocking feature for the directory number(s) associated with the unique ID. Unlike traditional call blocking, the use of a unique ID permits blocking of multiple directory numbers; e.g., the calling party can have a home telephone number, a work telephone number, or simply have multiple lines. For the SMS/MMS blocking scenario, a messaging center (not shown) within the system that provides the SMS/MMS service can be instructed to not deliver the text message from the originating party. Also, with the blocking of an email, blocking platform 101 can communicate with the appropriate email system of the service 505 to block or otherwise filter the email from the originating party 127 and destined to the receiving party 129. Lastly, blocking platform 101 can coordinate an instant messaging system of service 507 to instruct the system to not deliver IM communications to the receiving party 129.

Figure 6:
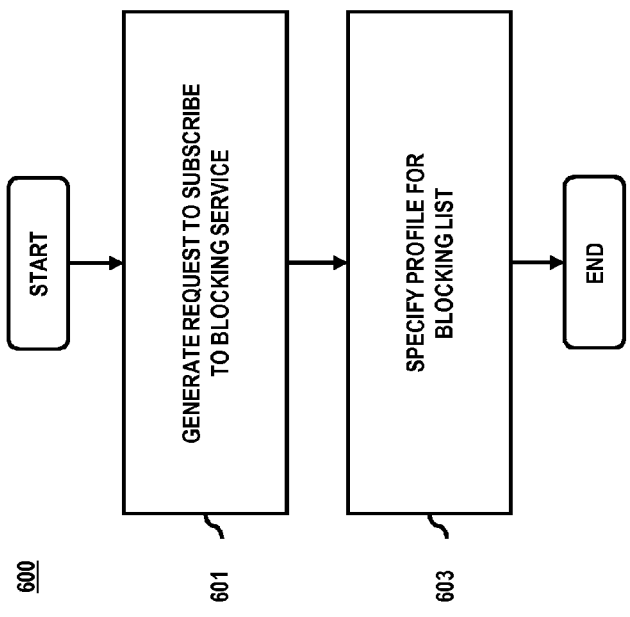
FIG. 6 is a flowchart of a process for subscribing to a universal blocking service, according to one embodiment.

FIG. 6 is a flowchart of a process for subscribing to a universal blocking service, according to one embodiment. The subscription process 600 can be performed in any number of ways, such by telephone with an interactive voice response (IVR) unit that collects subscription information from the user. Alternatively, the subscription process 400 can be conducted through a web portal that interfaces, e.g., through user interface module 305 of blocking platform 101. A request is generated to subscribe to the universal blocking service, as in step 601. In step 603, the process 600 permits the user to specify the profile for the blocking list. The profile information can specify the subscriber's communication services and associated communication identifiers, along with user preferences relating to scheduling of when and who to block. The user can specify, for example, all communication identifiers that the user seeks to block; in turn, platform 101 can determine the unique ID for these communication identifiers. Furthermore, in one embodiment, the user can specify a business type to block; for example, blocking platform 101 can categorize certain businesses that may be more likely to utilize telemarketing as a tool. The subscriber can elect to block communications from this category of businesses.

Figure 7:
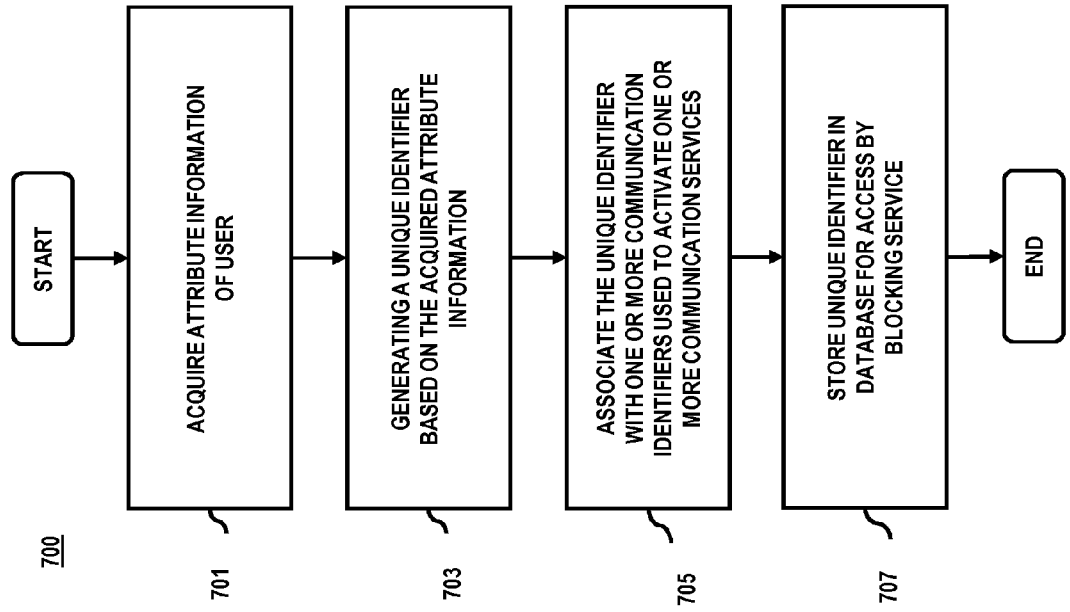
FIG. 7 is a flowchart of a process for generating a unique identifier to be utilized for blocking of communication sessions for multiple communication services, according to one embodiment.

FIG. 7 is a flowchart of a process for generating a unique identifier to be utilized for blocking of communication sessions for multiple communication services, according to one embodiment. In certain embodiments, unique IDs are generated, using process 700, for each and every user of system 100; as such, universal blocking platform 101 coordinates the acquisition of necessary data with the service provider networks 113 and 115.

In step 701, attribute information of a user is acquired. The attribute information, as noted, can be a personal identifier, such as tax payer ID or a SSN. A unique identifier is generated based on the acquired attribute information, as in step 703. That is, a conversion algorithm is executed to produce the unique identifier from the attribute information; this advantageously can mask any private information. In some embodiments, the unique identifier can simply be the attribute information. The unique identifier is then associated with various communication identifiers that are used to activate, respectively, multiple communication services (step 705). In step 707, the unique identifier is stored in unique ID database 107. The unique identifier is used to block communication sessions associated with the corresponding communication services.

It is noted that the steps of the process may be performed in any suitable order, as well as combined or separated in any suitable manner. The described arrangement and processes, in certain embodiment, advantageously provide efficient blocking of unwanted communications.

The processes described herein for providing universal blocking of communication sessions may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
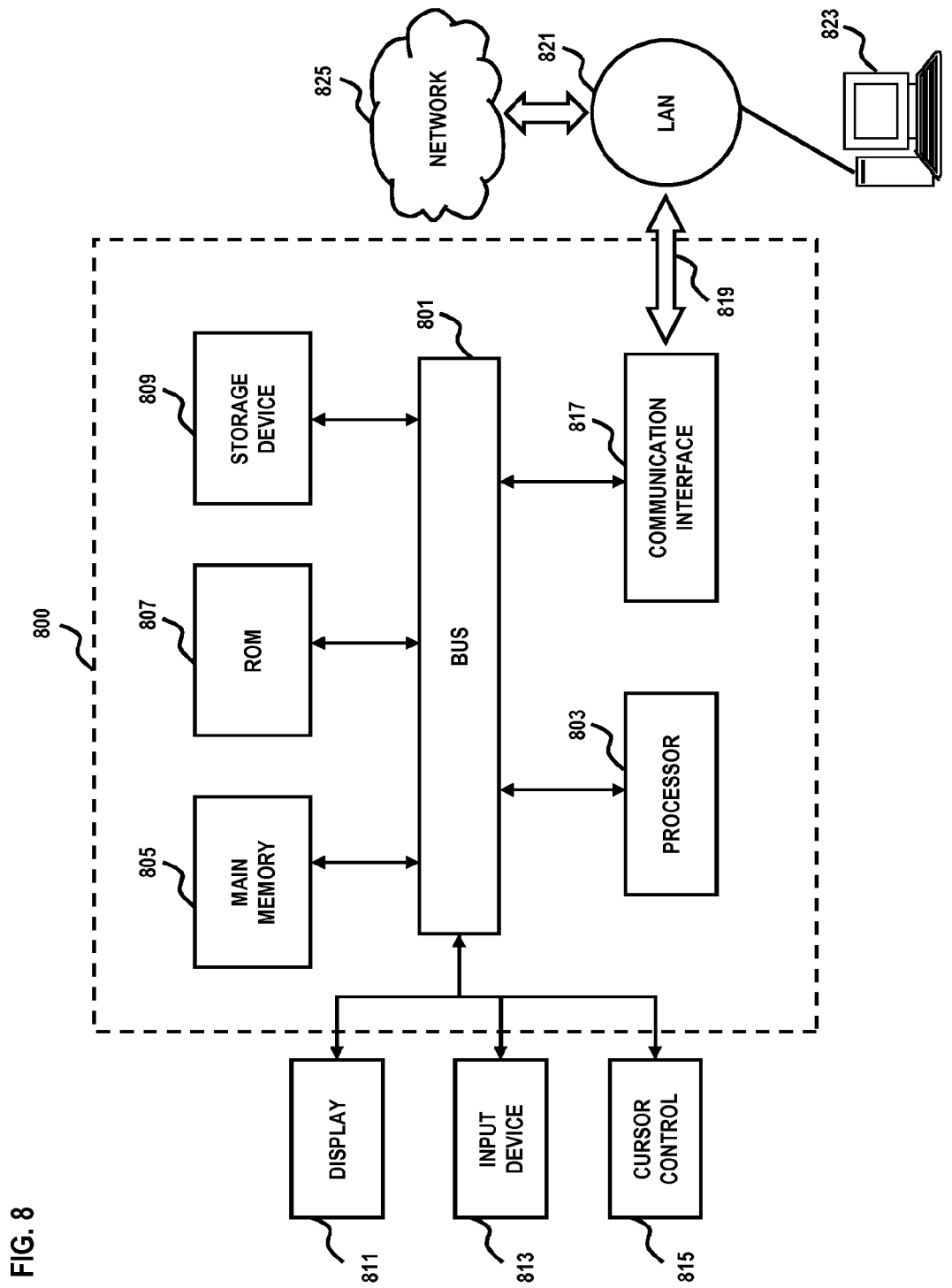
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
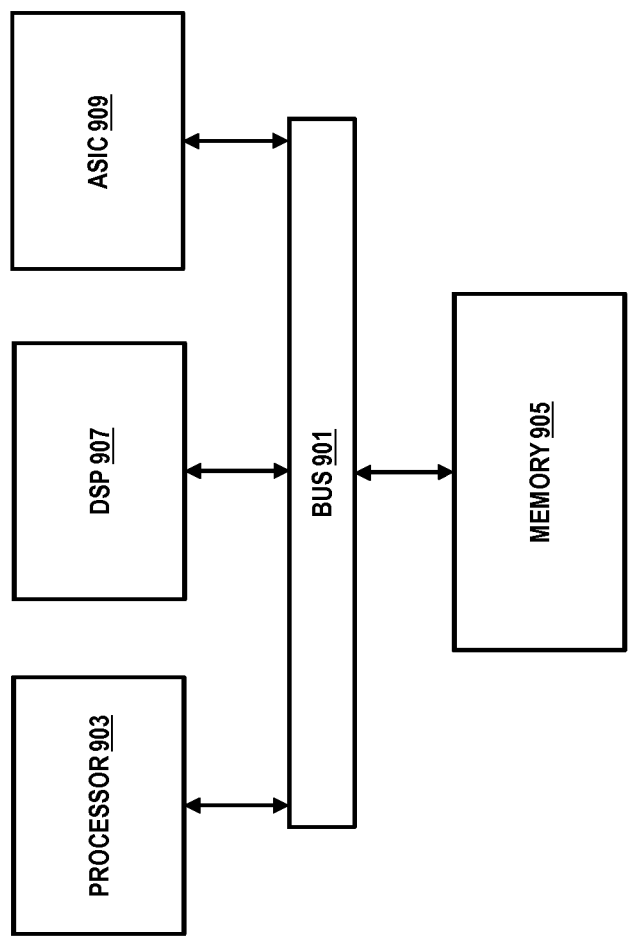
FIG. 9 is a diagram of a chip set that can be used to implement various exemplary embodiments.

FIG. 9 illustrates a chip set or chip 900 upon which an embodiment of the invention may be implemented. Chip set 900 is programmed to enable advertisers to correlate a communication session with the amount of consumption of the advertisement by a viewer as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of universal blocking of communication sessions.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable advertisers to correlate a communication session with the amount of consumption of the advertisement by a viewer. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
acquiring attribute information of an originating party of a communication;
generating a unique identifier for the originating party based on the acquired attribute information; and
associating the unique identifier with a plurality of communication identifiers that are used to activate, respectively, a plurality of communication services of the originating party,
wherein the unique identifier is used to block communication sessions from the originating party associated with the corresponding communication services,
wherein the attribute information of the originating party used to generate the unique identifier includes one or more of communication identifiers corresponding to the originating party, address, tax payer identification number, employer identification number, and social security number, and
wherein the unique identifier is other than a communication number or a communication address of the originating party.

2. A method according to claim 1, further comprising:
detecting establishment of one of the communication sessions;
determining that the one communication session is associated with the unique identifier; and
initiating blocking of the one communication session based on the determination.

3. A method according to claim 2, wherein the unique identifier is transported as part of establishment of the one communication session.

4. A method according to claim 1, wherein the blocking of the communication sessions is performed on a per access line basis.

5. A method according to claim 1, further comprising:
storing a plurality of unique identifiers, including the unique identifier, associated with a plurality of originating parties of communications in a database.

6. A method according to claim 1, wherein the communication services include telephony service, instant messaging service, short messaging service, email service, or a combination thereof.

7. An apparatus comprising:
at least one processor; and
at least one memory including computer program code for one or more programs,
the at least one memory and the computer program code configured to, with the at least one processor, cause the apparatus to perform at least the following, acquire attribute information of an originating party of a communication, generate a unique identifier for the originating party based on the acquired attribute information, and
associate the unique identifier with a plurality of communication identifiers that are used to activate, respectively, a plurality of communication services of the originating party,
wherein the unique identifier is used to block communication sessions from the originating party associated with the corresponding communication services,
wherein the attribute information of the originating party used to generate the unique identifier includes one or more of communication identifiers corresponding to the originating party, address, tax payer identification number, employer identification number, and social security number, and
wherein the unique identifier is other than a communication number or a communication address of the originating party.

8. An apparatus according to claim 7, wherein the apparatus is further caused to:
detect establishment of one of the communication sessions;
determine that the one communication session is associated with the unique identifier; and
initiate blocking of the one communication session based on the determination.

9. An apparatus according to claim 8, wherein the unique identifier is transported as part of establishment of the one communication session.

10. An apparatus according to claim 7, wherein the blocking of the communication sessions is performed on a per access line basis.

11. An apparatus according to claim 7, wherein the apparatus is further caused to:
store a plurality of unique identifiers, including the unique identifier, associated with a plurality of originating parties of communications in a database in a database.

12. An apparatus according to claim 7, wherein the communication services include telephony service, instant messaging service, short messaging service, email service, or a combination thereof.

13. A method comprising:
determining that a communication session is being established from an originating party to a receiving party;
determining that the receiving party is a subscriber to a blocking service;
retrieving a unique identifier for the originating party, wherein the unique identifier is associated with a plurality of communication services, and the communication session from the originating party corresponds to one of the communication services;
accessing a blocking list to determine whether the unique identifier is specified in the blocking list; and
initiating blocking of the communication session from the originating party if the unique identifier is specified in the blocking list,
wherein attribute information acquired from the originating party is used to generate the unique identifier and includes one or more of communication identifiers corresponding to the originating party, address, tax payer identification number, employer identification number, and social security number, and
wherein the unique identifier is other than a communication number or a communication address of the originating party.

14. A method according to claim 13, wherein the unique identifier is transported as part of establishment of the communication session.

15. A method according to claim 13, wherein the communication services include telephony service, instant messaging service, short messaging service, email service, or a combination thereof.

16. An apparatus comprising:
at least one processor; and
at least one memory including computer program code for one or more programs,
the at least one memory and the computer program code configured to, with the at least one processor, cause the apparatus to perform at least the following,
determine that a communication session is being established from an originating party to a receiving party, determine that the receiving party is a subscriber to a blocking service, retrieve a unique identifier for the originating party, wherein the unique identifier is associated with a plurality of communication services, and the communication session from the originating party corresponds to one of the communication services, access a blocking list to determine whether the unique identifier is specified in the blocking list, and initiate blocking of the communication session from the originating party if the unique identifier is specified in the blocking list, wherein attribute information acquired from the originating party is used to generate the unique identifier and includes one or more of communication identifiers corresponding to the originating party, address, tax payer identification number, employer identification number, and social security number, and wherein the unique identifier is other than a communication number or a communication address of the originating party.

17. An apparatus according to claim 16, wherein the unique identifier is transported as part of establishment of the communication session.

18. An apparatus according to claim 16, wherein the communication services include telephony service, instant messaging service, short messaging service, email service, or a combination thereof.

* * * * *